R. R. PALMER
*Washing Pebbles & Churning Butter.*
5045-X
3-21-1828
A. Stand. a. Uprights. b. Sills. c. Cross pieces. d. Standing pieces. e. Horizontal pieces.
F. Pieces Suspending Box
G. Lattice work Suspended in Box
H. Circular Lid
I. Handle
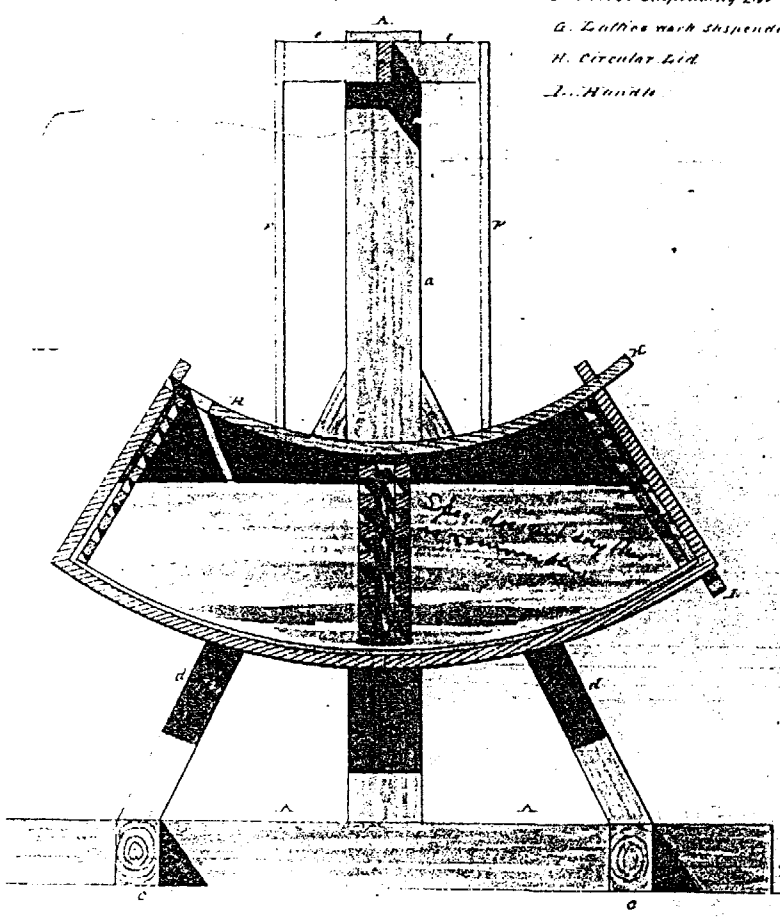
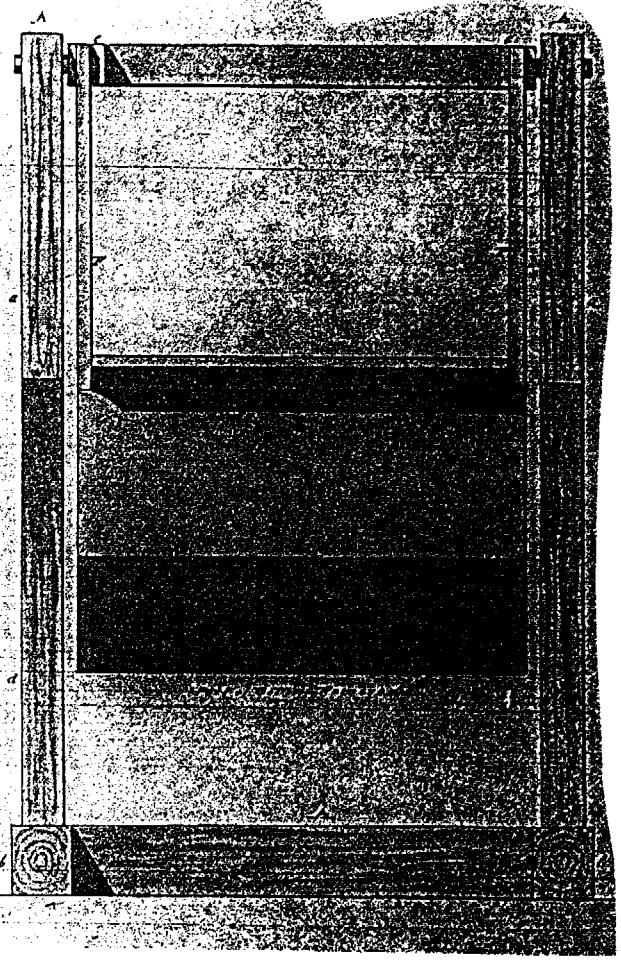

X0005045

Mar 21 1828

Rufus R. Palmer, Caroline Township, New York

Letters Patent.

The schedule referred to in these Letters Patent and making part of the
same containing a description in the words of the said Rufus R. Palmer
himself of his improvement in the machine for washing clothes, churn-
ing & working Butter, To all persons to whom these presents may come,
Rufus R. Palmer of Caroline Township & State of New York, sends
greeting. —— Be it known that I the said Rufus R. Palmer, have in-
vented a new and useful improvement in the machine for washing, also for
churning and working butter, specified in the words following to wit.
I first construct a stand by mortising two upright pieces about four feet in
length upon a sill constructed of two pieces four feet in length for the sides
of the sill, & two pieces mortised between these about three feet in length
these proportions are less when the machine is intended for a churn; the
upright pieces that are mortised upon the sill are supported by two slanting
pieces mortised upon the sill & perpendicular piece mentioned above, these
upright pieces are connected at top by a small piece. this piece at each extre-
mity is mortised thro' two horizontal pieces, about one foot in length each
these pieces are so placed as to permit the box containing the clothes &c. to swing
from side to side, The washing box is hung from the four extremities of these
two pieces by four pieces extending from the top of this box to these extremities;
The washing box is about eighteen inches deep. three & a half in length - the bottom
of this box is drawn by a section of a circle of six feet in diameter, the top is
drawn from the centre of the same circle. <u>A piece of lattice work is hung
perpendicularly between the two upright pieces above mentioned, this lattice</u>
work is <u>double, the whole</u> placed upon or between two pieces of wood, three
inches in breadth, the lattice work occupying two inches one on either side
of these pieces leaving one inch between each piece of of lattice work.
This lattice work hangs just in the centre of the box or churn, when hanging perpendicularly to the uprights described above. At the bottom of the box a number of narrow strips of wood are passed from one end of the box to the other. At each end of this box I also place lattice work reaching from the bottom to the top of the box.

In the churn, there is but one piece of lattice work, which is hung in the centre, in place of the double one used in the washing box. When the butter has been obtained by this Machine, two small pieces are placed at the bottom of the above mentioned lattice work, these pieces which may be removed at pleasure are intended to break the butter such is the machine for which I claim Letters Patent.

The machine is covered by a circular lid reaching from one end of the box to the other, this lid or cover is passed thro' an opening cut to receive it thro' the top of the end pieces, these openings that are left after this cover is put on are closed by pieces permanently fastened over them.

This machine is put in operation by alternately pushing & drawing it by means of a handle fastened on the bottom, for that purpose.

In testimony that the above is a true & exact description or specification of my said improvement, I have hereunto set my hand and seal the 20th day of March in the year of our Lord one thousand eight hundred and twenty eight.

Witnesses
C H W Wharton
Saml. a Martin

Rufus R. Palmer.

1086 words

Exd.
CK[illegible]